April 15, 1930.  A. J. KERCHER  1,754,561
CIRCUIT CONTROLLER
Filed Sept. 29, 1923

WITNESS:
H. Sherburne.

INVENTOR
Arthur J. Kercher.
By White, Prost & Evans
his ATTORNEYS.

Patented Apr. 15, 1930

1,754,561

UNITED STATES PATENT OFFICE

ARTHUR J. KERCHER, OF BERKELEY, CALIFORNIA, ASSIGNOR TO WESIX NATIONAL COMPANY, OF SAN FRANCISCO, CALIFORNIA, A CORPORATION OF DELAWARE

CIRCUIT CONTROLLER

Application filed September 29, 1923. Serial No. 665,704.

This invention relates to a switching device for controlling electric circuits, and more particularly to a device of that character in which a time lag is introduced into the operation of the device. In this way the response of the switch automatically to certain conditions is delayed so that temporary or heavily fluctuating conditions will not cause the objectionable, repeated operation of the switch in opposite directions.

It is thus one of the objects of my invention to provide such a time lagged device that will be reliable in operation and simple and inexpensive in construction.

Such automatic switches may be used to control the temperature of a body which is heated by electric current. In the usual form of such temperature responsive switches, use is made of some material, either liquid, solid, or gaseous, the physical configuration of which changes substantially with substantial variation in its temperature. The physical change in turn is caused to produce a mechanical movement that reacts directly on the switch contacts controlling tne heating circuit. In such an apparatus, the thermal responsive element that operates the contacts must be designed also to withstand the full temperature variations of the controlled body, and must respond in addition accurately to these variations. It is another object of my invention to make it possible to utilize as the thermal responsive element, a device that is simple and reliable under all conditions of service, and that is relieved from the duty of mechanically operating the heating circuit. In this connection another object of my invention is to utilize supplementary relay devices which are themselves operated by the application of heat controlled by the main thermostat.

It is still another object of my invention so to arrange the switch mechanism that it is positively operated to both the open and closed position by the expansion of heat responsive devices, such as closed elastic cells containing a readily volatilizable liquid. In order to effect this result, two opposed pressure cells are used, one for closing and one for opening the switch, each being provided with its own electrical heating element; and a master thermostat or other switch controls which of the two cells is to be supplied with heating current.

My invention has other advantageous features, some of which with the foregoing, will be set forth at length in the following description, where I shall outline in full that form of my invention which I have selected for illustration in the drawings accompanying and forming part of the present specification. Although I have shown in the drawings but one embodiment of my invention, I do not desire to be limited thereto, since the invention as expressed in the claims may be embodied in other forms also.

Referring to the drawings.

Figure 6:
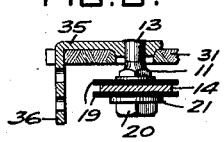
Fig. 6 is a sectional view taken along plane 6—6 of Fig. 3, and illustrating the construction of the main contacts.

In the present instance I have illustrated my invention in connection with a double pole switch, having a pair of movable contacts 11, 12 (Figs. 1, 2, 3 and 6) and a pair of stationary contacts 13 (Fig. 6). The movable contacts 11, 12, are each shown as pivotally supported, as by the aid of the strips 14 (Fig. 3) on a pin 15. This pin is in turn held at each end in blocks 16 which may be supported in any appropriate manner. In the present instance these blocks are supported by being strung on the rods 17, which also serve to hold substantially the entire mechanism together in a rigid manner, as will be described hereinafter. The strips 14 may be each formed with an eye at the pivoted end, as by bending them over.

The contacts 11 and 12 are insulated from the strips 14, as by the aid of the insulation washers 19, and connection may be made to each of them by connecting a wire between the nut 20 and the metal washer 21. This nut serves to tighten its associated contact stud, which has a shank portion extending through the strip 14.

Figure 1:
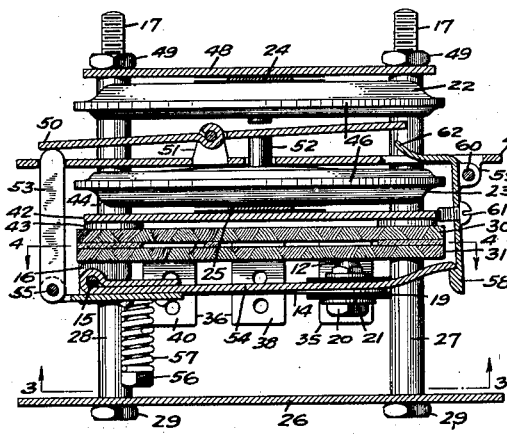
Figure 1 is a sectional view of a device embodying my invention, and illustrating the switch contacts in closed position.
Figure 2:
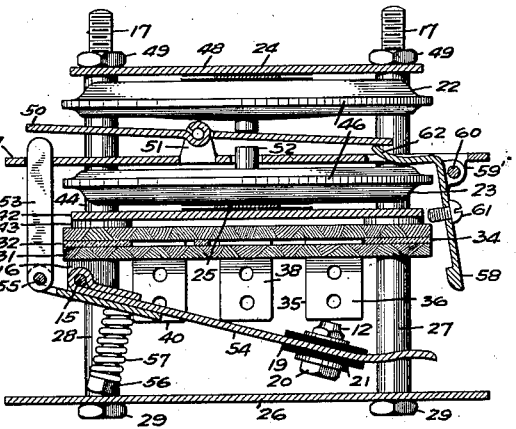
Fig. 2 is a view similar to Fig. 1 but with the contacts in open position.
Figure 3:
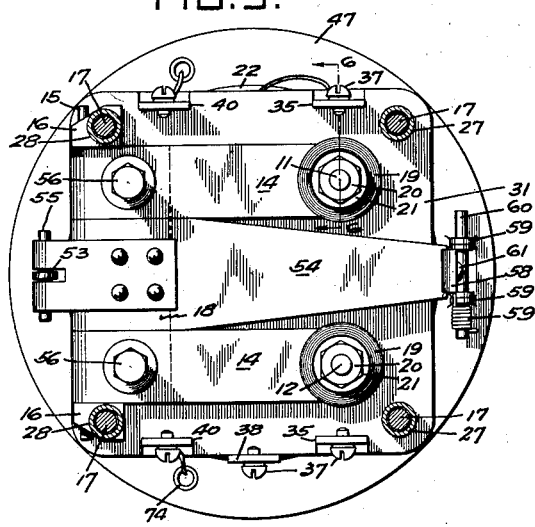
Fig. 3 is a sectional view taken along plane 3—3 of Fig. 1.

In order to move the strips 14 about pivot 15 and thereby to bring the movable contacts 11 and 12 into cooperative relation with the stationary contacts 13, and reversely to move them apart, I provide a pair of thermal responsive devices, such as pressure cells 22 and 23. These cells are preferably formed of thin resilient metal such as copper or phosphor bronze, and contain a readily volatilizable liquid, which is held therein in an air-tight manner. Whenever sufficient heat is imparted to cell 22, it is caused to expand as shown in Fig. 2, due to the liquid pressure within it, and thereby cause the rotation of strips 14, say to opening position of the contacts. On the other hand, the expansion of the other cell 23, as shown in Fig. 1, causes the strips 14 to rotate in the opposite direction and close the contacts. These cells are arranged to be heated by the aid of the electrical heating elements 24 and 25, placed respectively adjacent cells 22 and 23.

Figure 4:
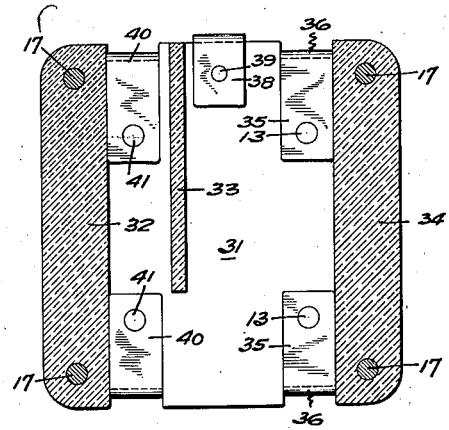
Fig. 4 is a sectional view taken along plane 4—4 of Fig. 1.

The manner in which the cells are supported, as well as the heating elements, may now be described, before the details whereby they mechanically control the strips 14 are set forth at length. There are four of the supporting studs 17, all of which pass through a metal base plate or support 26. This plate 26 is held axially against movement along the rods or studs 17, as by the aid of the spacer bushings 27 and 28 passing over the studs, and the nuts 29 threadedly engaging the ends of the studs. Above the spacers are accommodated the insulating sheets 30 and 31 and the insulation spacers 32, 33, and 34 (Fig. 4), separating these two sheets. However, immediately below the sheet 31 and over the shorter bushings 28 at the left, the bearing blocks 16 are accommodated, as shown most clearly in Figs. 1 and 3. The space between the plate 26 and the sheet 31 is utilized for the accommodation of the strips 14 as they swing between the two extreme positions of Figs. 1 and 2. The space between the two insulation sheets 30 and 31 serves to accommodate the various connection bars, which have extensions beyond these sheets. Thus the bars 35 are clamped between the sheets 30 and 31, and these bars support the contact studs 13 that project through the lower sheet 31, as illustrated most clearly in Fig. 6. These bars are furthermore bent downward as indicated at 36 (Figs. 2 and 6) so as to permit electrical connections to be made to them, as by the aid of screws 37. A somewhat similar bar 38 is also clamped between the two sheets 30 and 31, and serves also as a connection for the electric circuits. Through this bar and the sheets 30 and 31 a screw 39 may pass which may serve still further to clamp these parts together. Additional L shaped bars 40 may also be provided, which are also clamped between the sheets 30 and 31, against relative movement by the dowel pins 41.

Figure 5:
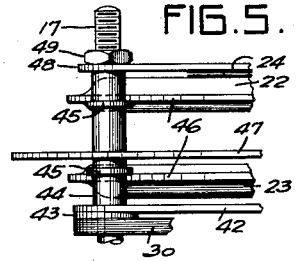
Fig. 5 is a fragmentary side elevation of the switch, showing the manner in which the pressure cells are supported.

The lower pressure cell 23 is shown as supported on a metallic plate 42, spaced from the top insulation sheet 30 by the aid of washers 43. The heating element 25 is disposed between the cell 23 and this plate 42. Fig. 5 illustrates how the cell may be fastened in place. Above plate 42, bushings or spacers 44 are inserted over all four rods 17; on top of these bushings are disposed the washers 45, and engage a flange 46 on the cell. Spaced above the cell by a distance sufficient to permit expansion of the cell to the position of Fig. 1 is another circular metal plate 47. In the space defined between this plate and a top plate 48, the top cell 22 is disposed. This cell, as illustrated in Fig. 5, is clamped to the top plate 48 in a manner entirely analogous to that already described in connection with the lower cell. Nuts 49, disposed on rods 17, serve to clamp the entire assembly together. The space between plates 47 and 48 is large enough to permit the expansion of cell 22 and to accommodate certain other mechanical details, which will now be described.

In order that the expansion of either of the cells 22 or 23 may mechanically actuate the switch, I provide an intermediate connection, such as a pivoted lever 50, which is tiltable by either of the cells. This lever is conveniently supported on lugs 51 struck up from plate 47, and is disposed between the two, as clearly shown in Figs. 1 and 2. The lower cell 23 has a stud or projection 52 that projects up through the plate 47. This stud is adapted, when the cell 23 is expanded as in Fig. 1, to tilt the lever 50 in a counter-clockwise direction. This is accomplished with a considerable force, and the force is transmitted to a link 53 extended through the plate 47. The downward movement of the link is in turn translated into a rotational movement of a lever 54 to which the link is connected pivotally, as at 55. This lever is pivoted on pin 15 between the two contact carrying strips 14. A bar 18 connected to the lever 54 extends across the strips 14, near their pivot point; this bar is resiliently connected to the strips 14, as by the aid of screws 56 passing freely through the strips and fastened into bar 18, and the compression springs 57, which extend between the heads of the screw 56 and the lower side of the strips 14. In this manner, relative movement between lever 54 and contacts 11 and 12 is permitted, and is resiliently taken up by the springs 57.

It is now seen that a downward thrust on link 53 will cause a counter-clockwise movement of lever 54 and therefore a resilient engagement of the contacts 11, 12 with the contacts 13. In order to maintain the contacts closed, an arrangement is provided for latching lever 54 in its closed position, as by a latch 58 pivoted in lugs 59' struck up from plate 47. This latch engages the free end of lever 54 as indicated most clearly in Fig. 1, and is urged to engaging position by a small spring 59 (Fig. 3) coiled around the pivot 60 of the latch. An adjusting screw 61 is provided that permits setting the latch in such position while lever 54 is free, that the latch may readily snap into place upon moving the lever upward.

The lever 54 being once latched, the contacts are maintained in closed position until the upper cell 22 becomes expanded, due to the energization of its heating element 24. The expansion of cell 22 causes the lever 50 to tilt in a clockwise direction, as illustrated in Fig. 2. The right hand portion of lever 50 coacts with the projection 62 of latch 58 to rotate it to releasing position against the action of spring 59. The lever 54 and the contacts 11 and 12 associated therewith, then drop down by gravity to the open position of Fig. 2, and remain there until the "on" cell 23 becomes active again.

Figure 7:
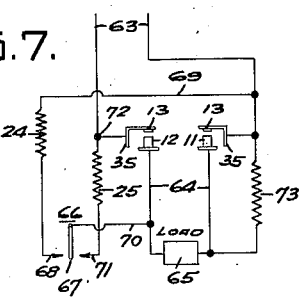
Fig. 7 is a wiring diagram of a system utilizing my invention.

Although I have illustrated in the present instance a double pole switch, it is of course evident that any number of contacts can be utilized if desired. One manner in which a double pole arrangement can be utilized in a system is illustrated diagrammatically in Fig. 7. In this figure the two incoming mains 63 connect to the stationary contact clips 35, while the outgoing load lines 64 connect to the movable contacts 11 and 12. With the contacts closed, the load 65 is supplied with electrical energy.

A master relay or switch 66 is used to control the energization of the heating elements 24 and 25; if desired automatically in response to load conditions. For example, the load 65 may be a heater device, and switch 66 may be operated in response to temperature conditions at or near the load. Thus the arm 67 may be moved say to the left to contact with the left hand stationary contact 68, upon a definite high temperature being reached. The circuit for the heating element 24 is then closed, as follows:—from right hand main 63, connection 69, element 24, contact 68, arm 67, connection 70, movable contact 12, stationary contact 13, back to the left hand main 63. As soon as sufficient heat is imparted to the upper cell 22, the latch 58 is released, and contacts 11, 12 separate from contacts 13. This action not only opens the load circuit, but the heating circuit through element 24 as well.

As soon as the load conditions become such that it is desirable to reconnect the circuit, such as a sufficient reduction of temperature, arm 67 will make contact with the right hand contact 71. The circuit for the "on" cell heating element 25 is then completed, as follows:—from left hand main 63, connection 72, element 25, contact 71, arm 67, load 65, resistance 73, back to the right hand main 63. It is to be noted that in this connection, a series circuit is completed through the element 25, load 65, and resistance 73. This resistance is inserted to maintain the heating current through element 25 at the desired low value. As soon as sufficient heat is imparted by this element to the "on" cell 23, it expands and tilts lever 50, which in turn causes the lever 54 to be moved into the position of Fig. 1, where it may be retained by the latch 58. As soon as the contacts close, the element 25 is short-circuited by contacts 12 and 13, and thus becomes deenergized. The cycle of operations may now be repeated as often as desired.

One of the great advantages of this device is that a comparatively small heating current may be used through the elements 24 and 25, since the absorption of heat by cells 22 and 23 is a cumulative process. Thus if a smaller current be used, it merely takes somewhat longer to transfer the necessary heat energy to the cells, but nevertheless the device would still be operative. Due to this feature, a very sensitive control by the master switch 66 is possible; this switch may be relatively small and delicate.

In order to facilitate the leading of connections to the various elements of the switch, appropriate apertures may be provided in the various plates 26, 42 and 47. Thus for example a bushed aperture 74 (Fig. 3) is provided in plate 47 for conducting one of the connections to or from the upper "off" cell 22. Furthermore any appropriate form of cover may if desired be used for the entire switch.

It is furthermore apparent that the control circuits of the two heating elements 24 and 25 differ; the "off" element 24 is connected in shunt to the load and in such a way that opening of the load circuit disconnects this element. On the other hand, the "on" element when active is in series connection, and is short-circuited when the contacts finally close. The resistor 73 is also short circuited thereby, and need be used only when a double pole switch is used. When only a single pair of contacts is provided, the element 25 is made of sufficiently high resistance so that it in connection with the load permits only a small heating current to flow during the active period of the element.

I claim:

1. In a circuit controller, a pair of contacts relatively movable to either a closed or open position, said contacts being normally urged toward open position, means for moving said contacts to closed position comprising a cell adapted to expand along at least one dimension in response to heat absorption, means for retaining said contacts in closed position, and means responsive to an electrical current for releasing said retaining means.

2. In a circuit controller, a pair of contacts relatively movable to either a closed or open position, said contacts being normally urged toward open position, means for moving said contacts to closed position comprising a cell adapted to expand along at least one dimension in response to heat absorption, means for retaining said contacts in closed position, and thermal responsive means in addition to said cell for releasing said retaining means.

3. In a circuit controller, a stationary contact, a pivoted lever, a cooperating movable contact supported on said lever, a link pivoted to one end of the lever, a pivoted rod adapted at one of its ends to move the link and thereby rotate the lever to closed position, a latch to maintain the lever in this position, said pivoted rod adapted at its other end to engage the latch and thereby release the lever, a pair of opposed thermal responsive devices for moving the pivoted rod in opposite directions, and electrical heating means for each of said devices.

4. In a circuit controller, a stationary contact, a pivoted lever, a cooperating movable contact supported on said lever, a link pivoted to one end of the lever, a pivoted rod adapted at one of its ends to move the link and thereby rotate the lever to closed position, a latch to maintain the lever in this position, said pivoted rod adapted at its other end to engage the latch and thereby release the lever, a pair of opposed pressure cells for moving the pivoted rod in opposite directions, and electrical heating means for each of said cells.

5. In a circuit controller, a pair of contacts relatively movable to either a closed or open position, said contacts being normally urged toward open position, means for moving said contacts to closed position comprising a cell adapted to expand along at least one dimension in response to heat absorption, means for retaining said contacts in closed position, and means for releasing said retaining means, said last named means comprising another cell adapted to expand along at least one dimension in response to heat absorption.

6. In a circuit controller, a pair of contacts relatively movable to either a closed or open position, said contacts being normally urged toward open position, means for moving said contacts to closed position comprising a cell adapted to expand along at least one dimension in response to heat absorption, means for retaining said contacts in closed position, and current responsive means in addition to said cell for releasing said retaining means.

In testimony whereof, I have hereunto set my hand.

ARTHUR J. KERCHER.